July 20, 1965 M. TEIG 3,196,413

NON-DESTRUCTIVE MAGNETIC MEMORY

Filed Dec. 19, 1960

INVENTOR
MICHAEL TEIG

BY [signature]
ATTORNEY 3,196,413
Patented July 20, 1965

3,196,413

NON-DESTRUCTIVE MAGNETIC MEMORY

Michael Teig, Yonkers, N.Y., assignor to International Business Machines Corporation, New York, N.Y., a corporation of New York Filed Dec. 19, 1960, Ser. No. 76,807
15 Claims. (Cl. 340—174)

This invention relates to magnetic memories and more particularly to an improved method of and means for non-destructively reading out the information retained in the memory.

Memories employing magnetic cores made of material exhibiting different stable states of flux remanence are now commonly employed in data processing equipment. The different remanence states of the cores are popularly employed to designate and store binary information. It is the usual practice to write desired information into the memory by establishing a group of these cores in predetermined states of remanence to make up a memory word. The information thus stored is read out by establishing each of the cores in a datum stable state, i.e. either the 1 or 0 remanence state.

Heretofore, it has been well recognized that the versatility of such memories is greatly enhanced when the read out of stored information is non-destructive as compared to destructive type read out. In destructive type read out each of the cores is returned to the datum stable state, either 0 or 1, and those cores in the opposite stable state induce a substantial output signal on a sense winding coupled thereto, while those cores in the datum stable state induce little or negligible voltage on their respective sense windings. In the non-destructive type memory, the cores are interrogated by signals which provide outputs distinguishable as to amplitude but without change of state.

One method of providing non-destructive type read out wherein the outputs are distinguishable as to amplitude is described in a publication entitled "The Utilization of Domain Wall Viscosity," by V. L. Newhouse, appearing in the Proceedings of the IRE, November 1957. The publication describes how magnetic cores made of material exhibiting a substantially rectangular hysteresis characteristic and a static switching threshold may be so energized as to exhibit the property of elasticity of its domain walls. This elasticity is exhibited by subjecting the core to a field of greater amplitude than the static magnetic threshold but of such a short duration as to prevent appreciable irreversible switching. With respect to the elasticity behavior as reported by Newhouse, a publication entitled "Elastic Switching Properties of Some Square Loop Materials in Toroidal Structures," by W. C. Seelbach, et al., appearing in the JAPS, vol. 31, No. 5, pages 135S–136S, for May 1960, defines the field strength for a given duration at which inelastic switching just starts and therefore the upper limiting field strength for elastic switching as the "turn over" field, and this term will hereinafter be referred to in both the specification and claims. In a bipolar mode of operation any irreversible switching which does take place within the core is reestablished by subjecting the core to an identical field of identical duration but of opposite sense. This method, however, yields very small signal to noise ratios, in that by employing the best type core, i.e. metallic tape wound cores, a realizable maximum of about 20% of the total flux may be reversibly switched and for ferrite type cores only an approximate maximum of 4% of the total flux is reversibly switched. Thus the signal to noise ratio of the useful outputs available is very small and for fabrication of large memory arrays such a method is impractical since the signal provided by such a method is almost indistinguishable. In the Newhouse method described above when the core is in the opposite state, that is opposite with respect to the datum stable remanence state, and the first field is applied, the core switches along the slope of a hysteresis characteristic towards the right and saturation and then relaxes back to the remanence state to provide negligible flux change and hence negligible output signal on the sense winding. When, however, the second or reorienting field is applied to the core, the material moves along its hysteresis characteristic towards the left and at the termination of the field, relaxes to a remanent state which defines a lower total flux within the core. If the fields are applied to switch a greater amount of flux to thereby provide a greater output signal for a desired binary designation, then the core is disturbed, and the next interrogation field applied would switch a larger amount of flux to provide an appreciable signal on the output or sense winding obliterating the distinction between the difference stable states and thus the information retained.

It may be seen, therefore, that where the tendency of the output signal, and hence the percentage of flux capable of being switched, is based completely on the domain wall viscosity effect, the pulse width employed is limited to a predetermined range wherein the viscosity effect takes place. What has been found is that by employing a bias and fields within a range in which the domain wall viscosity effect takes place with an additional irreversible flux change, a large signal for non-destructive read out is provided. By employing this latter technique, it has been found that as much as 70% of the total flux of a tape wound core may be switched for non-destructive read out as compared with the approximate maximum of 20% when employing elasticity effects alone and as much as 40% for ferrite type cores as compared with only 4% for elasticity effects alone.

More specifically, magnetic rectangular hysteresis loop material exhibits a family of hysteresis loops. A D.C. "major loop" is defined as that static hysteresis loop which is observed when alternately setting and resetting the core to its negative and its positive full saturation with pulses of long duration. A D.C. "minor loop" is defined as that static loop traversed and observed by alternately setting and resetting the core to remanent magnetization states less than maximum. A "minor loop" then exhibits a lower D.C. threshold than the "major loop." It is this property of the material of magnetic cores which is utilized to provide a novel and improved method and means for non-destructively sensing this state of a memory core in any given array.

According to this invention, apparatus comprising a magnetic core made of material exhibiting a family of static rectangular hysteresis loops is provided having a given turnover field strength, said family of loops defining an outer major loop and a plurality of inner minor loops each exhibiting a respective static switching threshold, input means are provided for establishing said core in either a datum or an opposite stable state on said major loop, and means are provided for non-destructively reading out the state of said core comprising means including said input means for applying an interrogation field to said core tending to change the state of said core and having a magnitude in excess of the static threshold of the major loop but a field strength insufficient to overcome the turnover field of said core, and means for applying a bias field to said core tending to saturate said core in the datum state having a magnitude in excess of the static threshold of a predetermined one of said minor loops but less than the static threshold of said major loop. The turnover field strength of the core is not exceeded when interrogation takes place since any increase in magnitude or duration of the field causes the core to switch to the opposite stable state after a few interrogation cycles.

According to one embodiment of this invention, the interrogation and bias fields are applied to the core so that the interrogation field is applied within the duration of the bias field and the core is pulse biased, while in another embodiment, the interrogation field is first applied and thereafter the bias field. In the prior embodiment, the net field applied to the core during interrogation has a magnitude in excess of the static threshold of the major loop and is limited to a field strength less than the turnover field of the core and thereafter the bias field takes over to restore most of the flux irreversibly switched. In the latter embodiment, the bias field is applied after interrogation and in both cases, the core is pulse biased. In still another embodiment, the core is continuously biased. In the first two embodiments, implementation into the well known coincident selection type memory is readily achieved due to pulse biasing, however, where a continuous bias is employed, the memory is word oriented and therefore each memory word must be set to an opposite stable state before writing takes place.

Accordingly, it is a prime object of this invention to provide an improved method and means for non-destructively interrogating a bistable magnetic core.

It is a more specific object of this invention to provide an improved method and means for non-destructively interrogating a bistable magnetic core to provide greater output signals and signal to noise ratios than heretofore realized.

Another object of this invention is to provide a random access magnetic memory in which the cores may be non-destructively sensed to provide sufficiently large output signals allowing greater discrimination in large size memories.

Still another object of this invention is to provide a random access magnetic core memory wherein non-destructive readout is accomplished by biasing the core to be read out with a field which does not exceed the static threshold of the major hysteresis loop of the core but does exceed the static threshold of a minor hysteresis loop.

The foregoing and other objects, features and advantages of the invention will be apparent from the following more particular description of preferred embodiments of the invention, as illustrated in the accompanying drawings.

Figure 1:
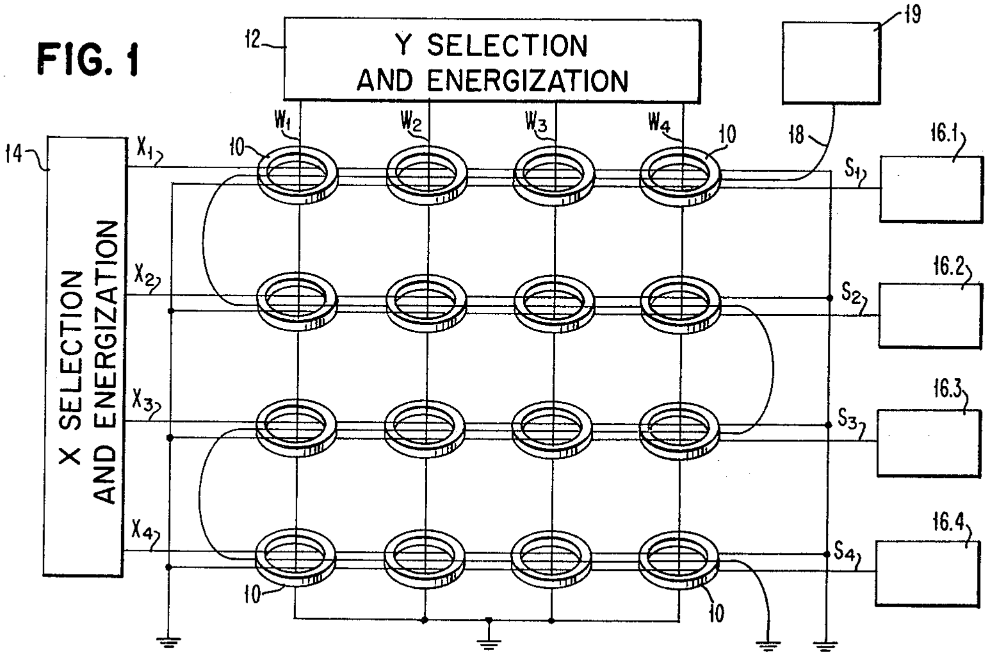
FIG. 1 is a schematic drawing of an embodiment of this invention.

Referring to the FIG. 1, there is shown a schematic illustration of a conventional two dimensional memory, more popularly known as a word oriented memory. There is provided, in FIG. 1, a plurality of bistable magnetic cores 10 arranged in word columns and rows. Each respective word column of cores 10 is coupled by a respective word column selection winding W while each respective row of cores 10 is coupled by a respective row selection winding X. Each of the column selection windings W are connected to a selection and energization means 12 while each of the row selection lines X are connected to a selection and energization means 14. Each row of cores 10 is further coupled by a respective sense winding $S_1$–$S_4$ having one end connected to ground and the other end connected to a load 16.1–16.4. All the cores 10 of the matrix are coupled by a bias winding 18 connected to a source 19. The matrix of FIG. 1 is termed a word organized memory in that each column of cores is considered a memory word while each row of cores is considered one bit of the respective words. The different sense windings $S_1$–$S_4$ couple each of the cores in the different respective rows to provide an individual output manifestation for each bit of a word to be read out or interrogated.

Figures 2, 3:
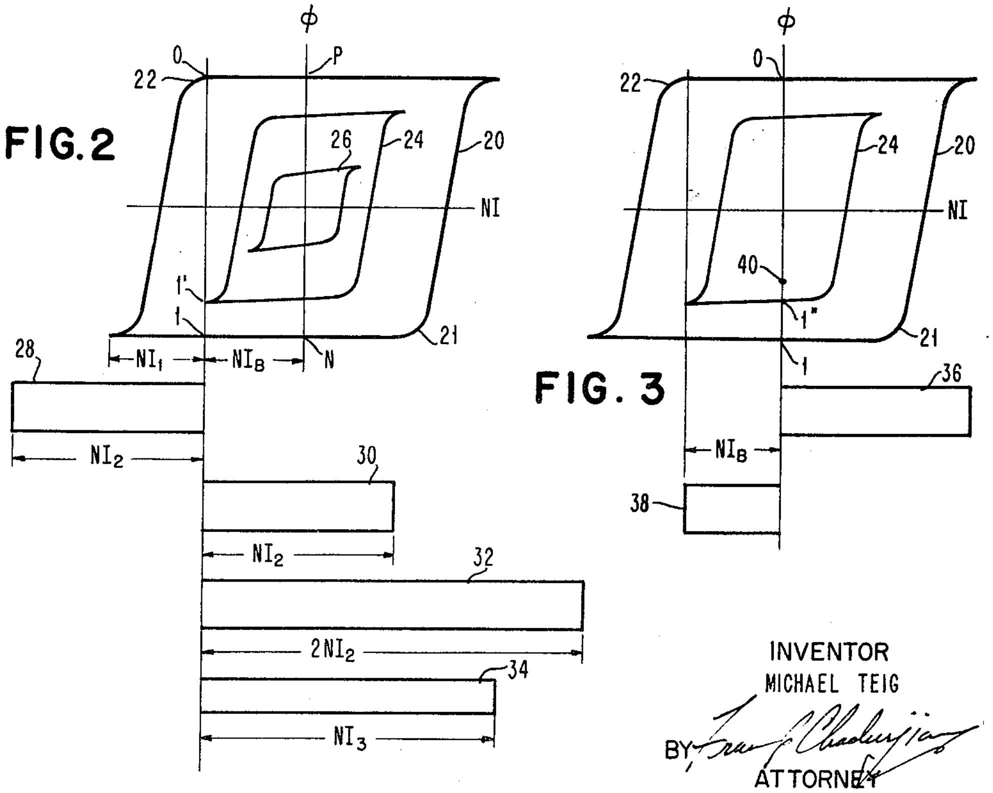
FIG. 2 illustrates the characteristic curve of the type material employed for the magnetic elements of FIG. 1 with biasing and interrogation represented according to one embodiment of this invention.
FIG. 3 illustrates the same characteristic as shown in FIG. 2 with biasing and interrogation represented according to still another embodiment of this invention.

Referring now to FIG. 2, there is shown a plot of flux ($\phi$) vesus applied field (NI) for the type of magnetic material employed for the cores 10 in FIG. 1. This type material is popularly known as "rectangular loop" magnetic material since the curve is a substantially rectangular hysteresis characteristic. The characteristic shown in FIG. 2 is the static or D.C. magnetic characteristic of the material, and exhibits a family of hysteresis loops. This family of hysteresis loops is considered with respect to an outer or "major hysteresis loop" 20, having clearly defined the static thresholds 21 and 22, and with respect to a plurality of inner and succeedingly smaller "minor hysteresis loops" such as 24 and 26 each of which have correspondingly smaller static thresholds. The "major loop" 20 of the material may be determined by alternately setting and resetting the core to its limiting negative and its positive full saturation state using pulses of long duration while the "minor loops" 24 and 26 are determined by alternately setting and resetting the core to remanent magnetization states less than maximum. As may be seen with reference to the loop 20 there are defined opposite stable remanent states labelled P and N which are normally employed to represent binary information.

Referring now to both the FIGS. 1 and 2, the source 19 energizes the winding 18 to bias each of the cores 10 and apply a field $NI_B$ which does not exceed the static magnetic threshold 22 of the major loop 20 but does exceed the static magnetic threshold of the minor loop 24. Since, in this embodiment, each core 10 is always biased, the point of bias and the positive flux state of the core is designated and labelled as the 0 stable state of the core while the opposite point on curve 20 is considered the 1 stable state of the core to designate the binary information. Generally, when the remanence states P and N are employed, a half select field is usually applied having a magnitude $NI_0$ which is great enough to bring the core to its switching threshold but insufficient to cause switching. Due to $NI_B$, with the core in the 1 stable state, the minimum amount of field which must be applied to the core in order to establish the core from the 0 stable state to the 1 stable state is shown and labelled $NI_1$. With the core in the 0 stable state and a field applied in the negative sense, having an amplitude $NI_2$ which is greater than $NI_1$, the magnetization of the core is reversed along the curve 20 to negative saturation and upon termination of this field the core relaxes to the 1 stable state. Thus, by application of a field $NI_2$, as is shown by a pulse 28, which is aided by the bias field $NI_B$, the net magnitude is well in excess of the static threshold 22 of the major loop 20 and has a duration long enough to insure switching of the core to the stable state 1 upon termination. By application of a field 30 having a magnitude $NI_2$ of opposite polarity but of a duration similar to that of the field 28, due to the bias field $NI_B$ applied to each of the cores, the field 30 is too small to exceed the static threshold 21 of the major loop 20, thus no switching occurs. Note, that the field $NI_2$ is made equal to $(NI_0+NI_B)$ and $NI_2$ is employed for symmetry of drives. Thus, to write information into the memory of FIG. 1, a particular word location is addressed, say that word associated with the word column drive line $W_1$. The selection and energization means 12 operate to apply a field 28 as is shown in FIG. 2 to each of the cores 10 in the column $W_1$ which causes each of the cores to switch to the 1 stable state. Thereafter, those cores which are to be set to the 0 stable state are coincidently selected by energizing the winding $W_1$ to apply a field 30 to each of the cores 10 in the word column associated with the winding $W_1$ and coincidently the row selection windings X are energized to similarly apply a field 30 to predetermined cores 10 of word $W_1$. Those cores receiving coincident energization by the column winding $W_1$ and the row winding have applied thereto an input field 32 of magnitude equal to $2NI_2$. These cores then experience a net field of $(2NI_2-NI_B)$ causing those cores coincidently energized to switch from the 1 to the 0 stable state. Assume that the matrix of FIG. 1 is addressed to write a word of information into the first word column associated with the column winding $W_1$ and that the first core or bit of information associated with the core 10 at the intersection of the windings $W_1$ and $X_1$ is in the 1 state while the remainder of the cores associated with that column are in the 0 state. To non-destructively read out the information retained in each of the cores of the word associated with the column $W_1$, the winding $W_1$ is energized with a read signal such as to apply an interrogation field 34 as is shown in the FIG. 2 and labelled $NI_3$ to each of the cores 10 of that column. The net magnitude of the interrogation field is $(NI_3-NI_B)$ and exceeds the static magnetic threshold 21 of each core 10, but is of an amplitude and duration such that the net interrogation field does not exceed the "turnover point" of the core. The "turnover" field strength has been defined by Seelbach et al., op. cit., as that value of field at which any irreversible switching just starts and therefore is considered to be the upper limiting field strength for reversible switching. Thus, the "turnover point" may be said to be that operating point of the biased core at which for a given duration any increase of amplitude of the interrogation pulse will cause an appreciable net destruction of the 1 state thereof. Thus the field 34 may have many different amplitudes with correspondingly different durations and what is meant by field strength is a field of defined amplitude and duration. During the read operation the interrogation pulse 34 causes a partial irreversible switching of the flux in the core in addition to some reversible flux change due to the viscosity effect, and the core assumes a stable state defined by the bias applied to the core and the inner or minor loop 24, which is labelled as stable state 1′. It should be noted, that the bias field can only restore that portion of the flux which has a threshold lower than the bias field, while that portion of the flux defined by the major loop 20, which has a higher threshold cannot be restored by the bias field. It may be seen that successive interrogations of the core which is in the 1 or 1′ stable state will provide reorientation of the core back to the 1′ stable state.

Those cores which were initially in the 0 stable state are not affected by the interrogation pulse 34, in that, upon application of this field 34 to these cores, the material moves along its characteristic loop 20 towards saturation and upon relaxation of the interrogation field relaxes to the stable state 0 as shown. At this time, no pulsed reorienting field, as employed by Newhouse, is applied, so that the core is never disturbed while in the 0 state. With the first core of the first column $W_1$ the FIG. 1 read out to provide appreciable output signal on the sense winding $S_1$, each of the other cores have negligible signals induced on their respective sense windings $S_2$–$S_4$ and the information stored in the word associated with the first column $W_1$ is registered in each of the individual loads 16.1–16.4. Thus, parallel type read out is accomplished.

If the source 19 is provided with some sort of switching means such as a switch tube or semiconductor switching device, etc. to provide a pulse bias to the elements 10 of the matrix of FIG. 1 then a different mode of operation may be accomplished. More specifically reference is made to FIG. 3 wherein a plot similar to that shown in FIG. 2 is shown with the 0 and 1 stable states being the remanent stable states of the cores defined by the major loop 20. Operation of a matrix of FIG. 1 may then be achieved by normal coincident current selection techniques in that, when the writing operation is required, each of the selection windings energized applies a field less than the static threshold of the cores but when conjointly energized, that field required to switch the core from one remanent stable state 0 or 1 to another remanent stable state is provided. In this embodiment, however, nondestructive read out is accomplished by energizing a desired W column line, say the word line $W_1$ to provide a field such as 36 which is in excess of the static threshold 21 of the loop 20 but of such a pulse width and amplitude as to not exceed the "turnover point" of the core. Upon relaxation of the interrogation field 36 the core then assumes a remanent state such as that defined by reference 40. The source 19 thereafter applies a pulse bias to each of the cores having a magnetic field amplitude in excess of the static threshold of the inner minor loop 24 but less than the threshold 22 of the major loop 20. The bias field is applied in an opposite sense than the interrogation field 36 and is of such a duration as to cause the core to assume a remanent stable state 1″ at the termination thereof. It is obvious, that if the core is in the 0 remanent state upon application of the interrogation field 36 negligible flux change takes place and application thereafter of the bias field has no affect since its amplitude is less than the static threshold 22 of the loop 20. The advantage of the pulsed bias mode is that the interrogation pulse may be of lower amplitude since it does not have to overcome the bias. If the bias pulse is so timed as to "straddle" the interrogation pulse, the operation of the matrix would be identical to the D.C. bias mode as described with reference to the FIG. 2. If, on the other hand, the "restoring" pulse 38 occurs after the interrogation pulse, the core flux will first relax to the state defined by a point 40 and upon application of field 38, the flux of the core is restored to the 1″ state. The main difference between the D.C. bias mode and the pulse bias mode, is that the flux restoration starts from a static condition of the core flux, while in the D.C. biased mode or the "straddle" mode the flux restoration is continuously in effect and takes place when the core flux is in a dynamic state.

In order to aid in understanding and practicing the invention and to provide a starting place for one skilled in the art in the fabrication of this invention, a set of specifications for one embodiment of this invention is given below. It should be understood, however, that no limitation should be construed since other component values may be employed with satisfactory operation.

For a tape wound core of the type available by Dynacore Co., of ⅓ mil Mo-Permalloy having the specification $\frac{1}{32}$ x 0.1 x 10 wraps, the threshold field $NI_0$ was found to be 0.12 ampere turns, hereinafter abbreviated as AT, the flux capacity $2\phi_r$ was found to be 3.6 maxwells, and was provided with a bias field $NI_B$ of 0.105 AT. The clear and half select pulses as shown in the FIG. 2 were $NI_2$ having 0.21 AT with the interrogation field $NI_3$ of 0.96 AT having a pulse width of 100 nanoseconds and a rise time of 15 nanoseconds. The change of flux, $\Delta\phi$ for interrogation when the core was in the 0 state was found to be 0.2 maxwell, while the change of flux when the core was in the 1 state was 2.6 maxwells. A maximum alpha, $$\frac{\Delta\phi}{2\phi_r}$$

was found to be 72% with the signal to noise ratio, $s/n$, being 8.6 with respect to flux and 2.8 with respect to voltage.

For a ferrite core made of magnesium manganese similar to the General Ceramics Core S–4 having the specification of 80 x 115 x 55 mils, the threshold field $NI_0$ was found to be 0.330 AT and the flux capacity, $2\phi_r$, was found to be 19.2 maxwells. The core was biased by a field $NI_B$ of 0.30 AT and the half select fields $NI_2$ was 0.6 AT. The interrogation field $NI_3$ was 2.52 AT having a pulse width of 100 nanoseconds and a rise time of 15 nanoseconds. For interrogation, $\Delta\phi$ for the 0 state was 0.4 maxwell while for the 1 state 7 maxwells, giving a maximum alpha of 36%. The signal to noise ratio $s/n$ was then 17.6 for flux and 3.7 for voltage.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory matrix comprising a plurality of cores made of magnetic material exhibiting a given turnover field strength and family of rectangular hysteresis loops having respective static switching thresholds, said family of loops defining an outer major loop and a plurality of inner minor loops, said cores arranged in columns and rows, a plurality of column conductors each coupling all the cores in different columns, a plurality of row conductors each coupling all the cores in different rows, a plurality of sense conductors each coupling all the cores in different rows, means for applying a biasing field to all said cores having an amplitude less than the static switching threshold of said major loop but greater than the static switching threshold of one of said minor loops in a direction tending to establish said cores in a datum stable state, means for writing in desired information into a column of cores comprising first means for first energizing the column conductor corresponding to the desired column of cores to apply a field to each core in said column of cores in aiding relationship with said biasing field whereby said cores in said desired column are established in the datum stable state, means including said first means for thereafter energizing the same column conductor to apply a similar field in opposite sense to said column of cores, and further means for coincidently energizing selected ones of said row conductors to apply a similar field in aiding relationship to the field applied by said column conductor to thereby establish desired ones of said cores in an opposite stable state, and means for nondestructively reading out the information retained in said cores comprising, means including said first means for again energizing said desired column conductor to apply a field to each core in said column of cores having an amplitude sufficient to overcome said bias and the static major threshold of said cores but having a field strength insufficient to overcome the turnover field of said cores.

2. In a memory comprising a matrix of magnetic elements each made of magnetic material exhibiting a given turnover field strength and a family of rectangular hysteresis loops having respective static switching thresholds, said family of loops defining an outer major loop and a plurality of inner minor loops, said memory having input means for establishing said cores in different stable remanent states defined by the major loop for storing binary information, and means for non-destructively interrogating the state of a selected core comprising, means for applying a biasing field having an amplitude less than the static threshold of said major loop but greater than the static threshold of one of said minor loops, and means including said input means for coincidently applying a field in opposition to said biasing field within the duration thereof having an amplitude sufficient to overcome said biasing field and the static threshold of said major loop but of insufficient field strength to overcome the turnover field strength of said core.

3. In a circuit for storing binary information, the combination comprising, a core made of magnetic material exhibiting a given turnover field strength and a family of static rectangular hysteresis loops having respective static switching thresholds, said family of loops defining an outer major loop and a plurality of inner minor loops, a plurality of windings including a sense winding coupling said core, first means including a first number of said windings for establishing said core in either a datum or an opposite stable remanent state defined by said major loop, and means for non-destructively interrogating the state of said core comprising, means including a further one of said windings for applying a biasing field to said core having an amplitude less than the static switching threshold of said major loop but greater than the static switching threshold of one of said minor loops tending to switch said core to said datum state, and means including said first means for coincidently applying a field within the duration of said biasing field but in opposition thereto having an amplitude sufficient to overcome said biasing field and the static threshold of said major loop but of insufficient field strength to overcome the turnover field of said core whereby an output signal is induced in said sense winding only when said core is initially in said datum stable state.

4. A binary storage apparatus comprising a magnetic core made of material exhibiting a family of static rectangular hysteresis loops and a given turnover field strength, said family of loops defining an outer major loop and a plurality of inner minor loops each exhibiting respective static switching thresholds, input means coupling said core for establishing said core in either a datum or an opposite stable state on said major loop to represent said binary information, and means for non-destructively reading out the state of said core comprising, means including said input means for applying an interrogation field to said core tending to saturate said core in the opposite state having a magnitude in excess of the static threshold of the major loop but a field strength insufficient to overcome the turnover field strength of said core, and means for applying a bias field to said core tending to saturate said core in the datum state having a magnitude in excess of the static threshold of a predetermined one of said minor loops but less than the static threshold of said major loop.

5. The storage apparatus as set forth in claim 4, wherein said bias field is applied in overlapping time coincidence with said interrogation field.

6. The storage apparatus as set forth in claim 5, wherein said bias field is a pulsed field.

7. The storage apparatus as set forth in claim 4, wherein said bias field is applied after termination of said interrogation field.

8. Apparatus storing binary information comprising, a magnetic core made of material exhibiting a family of static rectangular hysteresis loops and a given turnover field strength, said family of loops defining an outer major loop and a plurality of inner minor loops each exhibiting respective static switching thresholds, input means for establishing said core in either a datum or an opposite stable state on said major loop, and means for non-destructively reading out the state of said core comprising, means including said input means for applying an interrogation direct current pulse field to said core tending to saturate said core in the opposite state having a magnitude in excess of the static threshold of the major loop but a field strength insufficient to overcome the turnover field strength of said core, and said last means including means for applying a bias field to said core tending to saturate said core in the datum state having a magnitude in excess of the static threshold of a predetermined one of said minor loops but less than the static threshold of said major loop.

9. Apparatus as set forth in claim 8, wherein said bias field is applied in overlapping time coincidence with said interrogation field.

10. Apparatus as set forth in claim 9, wherein said bias field is a pulsed field.

11. Apparatus as set forth in claim 8, wherein said biased field is applied after termination of said interrogation field.

12. Apparatus for storing binary information comprising, a magnetic core made of material exhibiting a family of static rectangular hysteresis loops and a given turnover field strength, said family of loops defining an outer major loop and a plurality of inner minor loops each exhibiting respective static switching thresholds, said core normally residing in one stable remanence state defined by said major loop, first means coupling said core for applying to said core a first field in a given direction having a magnitude greater than the static switching threshold of the major loop of said core but limited in duration such that the turnover field strength of the core is not overcome whereby said core is switched from said one stable state on said major loop to a first partially switched remanence state defined by one of said minor loops, and second means coupling said core for thereafter applying a second field to said core in a direction opposite to said given direction whose magnitude is less than the static switching threshold of said major loop whereby said core is switched from said first partially switched state to a different partially switched remanence state.

13. Apparatus as set forth in claim 12, wherein said first and second fields are applied in partial time coincidence to said core.

14. Apparatus as set forth in claim 12, wherein said second field is applied to said core upon termination of said first field.

15. In a circuit, a magnetic core made of material exhibiting a family of static rectangular hysteresis loops and a given turnover field strength, said family of loops defining an outer major loop and a plurality of inner minor loops each exhibiting respective static switching thresholds, said core normally residing in one stable remanence state defined by said major loop, a plurality of windings coupling said core, first means including one winding of said plurality of windings for applying a first field to said core having a magnitude in excess of the static switching threshold of the major loop of said core but limited in duration such that the turnover field strength of said core is not exceeded whereby said core is switched from said stable state on said major loop to a partial remanence state defined by one of said minor loops, second means including a different winding of said plurality of windings for thereafter applying a second field in opposite sense with respect to said first field having a magnitude less than the switching threshold of the major loop whereby said core is switched to a different stable remanence state.

References Cited by the Examiner

UNITED STATES PATENTS

| | | | |
|---|---|---|---|
| 2,898,581 | 8/59 | Post | 340—174 |
| 2,979,701 | 4/61 | Marchand | 340—174 |
| 3,029,415 | 4/62 | Baldwin | 340—174 |
| 3,032,749 | 5/62 | Newhouse | 340—174 |

OTHER REFERENCES

Publication: Proceedings of the IRE, pages 1081–1093, Aug. 9, 1957.

IRVING L. SRAGOW, *Primary Examiner.*